(12) United States Patent
McLaughlin et al.

(10) Patent No.: US 11,128,342 B2
(45) Date of Patent: Sep. 21, 2021

(54) METHOD AND APPARATUS FOR DETERMINING THE ANGLE OF DEPARTURE

(71) Applicant: DecaWave, Ltd., Dublin (IE)

(72) Inventors: Michael McLaughlin, Dublin (IE); Jaroslaw Niewczas, Jozefow (PL); Igor Dotlic, Dublin (IE); Billy Verso, Maynooth (IE)

(73) Assignee: DecaWave, Ltd., Dublin (IE)

( * ) Notice: Subject to any disclaimer, the term of this patent is extended or adjusted under 35 U.S.C. 154(b) by 0 days.

(21) Appl. No.: 16/780,004

(22) Filed: Feb. 3, 2020

(65) Prior Publication Data

US 2020/0252101 A1 Aug. 6, 2020

Related U.S. Application Data

(60) Provisional application No. 62/800,468, filed on Feb. 2, 2019.

(51) Int. Cl.
*H04B 1/00* (2006.01)
*H04B 1/7163* (2011.01)
(Continued)

(52) U.S. Cl.
CPC .......... *H04B 1/7163* (2013.01); *G01S 5/0221* (2013.01); *G01S 5/0226* (2013.01); *G01S 5/06* (2013.01)

(58) Field of Classification Search
CPC ...... H04B 1/707; H04B 1/7075; H04B 7/028; H04B 7/0413; H04B 1/7163;
(Continued)

(56) References Cited

U.S. PATENT DOCUMENTS

| 4,422,076 A | 12/1983 | Tricoles et al. |
| 4,626,860 A | 12/1986 | Tricoles et al. |

(Continued)

FOREIGN PATENT DOCUMENTS

| CN | 104484852 A | 4/2015 |
| WO | 2015051821 A1 | 4/2015 |
| WO | 2015176776 A1 | 11/2015 |

OTHER PUBLICATIONS

Alexander, S.N., "Soviet Computer Technology—1959," Communications of the ACM, vol. 3, Issue 3, Mar. 1960, pp. 131-166.

(Continued)

*Primary Examiner* — Khai Tran
(74) *Attorney, Agent, or Firm* — Withrow & Terranova, PLLC

(57) ABSTRACT

An ultra-wideband ("UWB") communication system comprising a transmitter having two transmit antennas and a receiver having a single receive antenna. Respective selected portions of the UWB signal are transmitted by the transmitter via each of transmit antennas is received at the receive antenna. By comparing the phases of the received signal portions, the phase difference of departure can be determined. From this phase difference and the known distance, d, between the transmit antennas, the Cartesian (x, y) location of the transmitter relative to the receiver can be directly determined.

13 Claims, 4 Drawing Sheets

(51) Int. Cl.
*G01S 5/02* (2010.01)
*G01S 5/06* (2006.01)

(58) Field of Classification Search
CPC ........ G01S 13/505; G01S 7/282; G01S 7/028; H04L 2027/00067
USPC .................................................. 375/141, 130
See application file for complete search history.

(56) References Cited

U.S. PATENT DOCUMENTS

| | | | |
|---|---|---|---|
| 4,734,702 | A | 3/1988 | Kaplan |
| 6,233,459 | B1 | 5/2001 | Sullivan et al. |
| 6,317,611 | B1 | 11/2001 | Kobayakawa |
| 7,349,461 | B2 | 3/2008 | Glazko et al. |
| 7,636,397 | B2 | 12/2009 | McLaughlin |
| 7,787,544 | B2 | 8/2010 | McLaughlin |
| 8,358,709 | B2 | 1/2013 | McLaughlin |
| 8,677,224 | B2 | 3/2014 | McLaughlin et al. |
| 8,693,286 | B1 | 4/2014 | Rogers et al. |
| 9,778,340 | B2 | 10/2017 | Mutz et al. |
| 10,056,993 | B2 | 8/2018 | Clancy et al. |
| 10,509,116 | B2 | 12/2019 | McLaughlin et al. |
| 2007/0085715 | A1 | 4/2007 | McLaughlin |
| 2007/0140323 | A1 | 6/2007 | Patel et al. |
| 2007/0159924 | A1 | 7/2007 | Vook et al. |
| 2008/0112440 | A1 | 5/2008 | Bedekar et al. |
| 2009/0243932 | A1 | 10/2009 | Moshfeghi |
| 2009/0310444 | A1 | 12/2009 | Hiroe |
| 2009/0316529 | A1 | 12/2009 | Huuskonen et al. |
| 2010/0087151 | A1* | 4/2010 | Auer ..................... H04L 5/0023 455/67.11 |
| 2010/0097270 | A1* | 4/2010 | Fukada ..................... G01S 3/48 342/442 |
| 2012/0276921 | A1 | 11/2012 | Nemeth |
| 2013/0163638 | A1 | 6/2013 | McLaughlin et al. |
| 2014/0093023 | A1 | 4/2014 | Park |
| 2014/0204977 | A1* | 7/2014 | Morche .................... H04B 1/69 375/130 |
| 2016/0254889 | A1 | 9/2016 | Shattil |
| 2016/0259033 | A1* | 9/2016 | Vladimirov ........... G01S 5/0205 |
| 2017/0085293 | A1 | 3/2017 | Marrow et al. |
| 2019/0204432 | A1* | 7/2019 | Safaripour ............ G01S 13/505 |
| 2019/0289568 | A1* | 9/2019 | Pajovic ................. G01S 5/0273 |
| 2019/0331781 | A1 | 10/2019 | McLaughlin et al. |
| 2019/0331782 | A1 | 10/2019 | McLaughlin et al. |
| 2019/0331783 | A1 | 10/2019 | McLaughlin et al. |
| 2020/0334394 | A1* | 10/2020 | Wodrich ............. G01S 5/02213 |

OTHER PUBLICATIONS

Carr, J.W. et al., "A Visit to Computation Centers in the Soviet Union," Communications of the ACM, vol. 2, Issue 6, Jun. 1959, pp. 8-20.

Loeffler, A., "Localizing with Passive UHF RFID Tags Using Wideband Signals," IEEE International Conference on Microwaves, Communications, Antennas and Electroic Systems (COMCAS), Nov. 7-9, 2011, Tel Aviv, Israel, IEEE, 6 pages.

Manteuffel, D. et al., "Antenna and Propagation impairments of a UWB localization system integrated into an aircraft cabin," 2010 Loughborough Antennas & Propagation Conference, Nov. 8-9, 2010, Loughborough, UK, IEEE, pp. 589-592.

Song, "A Low Complexity Asynchronous UWB TDOA Localization Method," International Journal of Distributed Sensor Networks, nol. 2015, Article IDS 675490, Oct. 2015, Hindawi Publishing Corporation, 11 pages.

Wang, Z. et al., "A New Multi-Antenna Based LOS-NLOS Separation Technique," 2009 IEEE 13th Digital Signal Processing Workshop and 5th IEEE Signal Processing Education Workshop, Jan. 4-7, 2009, Marco Island, FL, IEEE, pp. 331-336.

Non-Final Office Action for U.S. Appl. No. 15/375,739, dated Jun. 9, 2017, 12 pages.

Final Office Action for U.S. Appl. No. 15/375,739, dated Nov. 9, 2017, 14 pages.

Applicant-Initiated Interview Summary for U.S. Appl. No. 15/375,739, dated Mar. 1, 2018, 3 pages.

Notice of Allowance for U.S. Appl. No. 15/375,739, dated Jul. 17, 2018, 10 pages.

Non-Final Office Action for U.S. Appl. No. 15/974,412, dated Apr. 25, 2019, 9 pages.

Notice of Allowance for U.S. Appl. No. 15/974,412, dated Oct. 23, 2019, 8 pages.

Non-Final Office Action for U.S. Appl. No. 16/352,105, dated Aug. 25, 2020, 11 pages.

Final Office Action for U.S. Appl. No. 16/352,105, dated Feb. 5, 2021, 13 pages.

Non-Final Office Action for U.S. Appl. No. 16/352,372, dated Oct. 9, 2020, 13 pages.

Final Office Action for U.S. Appl. No. 16/352,372, dated Feb. 5, 2021, 15 pages.

International Search Report and Written Opinion for International Patent Application No. PCT/EP2013/070851, dated Jun. 4, 2014, 13 pages.

International Preliminary Report on Patentability for International Patent Application No. PCT/EP2013/070851, dated Apr. 21, 2016, 10 pages.

International Search Report and Written Opinion for International Patent Application No. PCT/EP2014/060722, dated Jan. 28, 2015, 10 pages.

International Preliminary Report on Patentability for International Patent Application No. PCT/EP2014/060722, dated Dec. 8, 2016, 8 pages.

Notice of Allowance for U.S. Appl. No. 16/352,480, dated Apr. 21, 2021, 8 pages.

Advisory Action for U.S. Appl. No. 16/352,105, dated May 10, 2021, 3 pages.

Non-Final Office Action for U.S. Appl. No. 16/352,105, dated Jul. 26, 2021, 10 pages.

Advisory Action for U.S. Appl. No. 16/352,372, dated May 19, 2021, 3 pages.

\* cited by examiner

METHOD AND APPARATUS FOR DETERMINING THE ANGLE OF DEPARTURE

CROSS-REFERENCE TO RELATED APPLICATIONS

The subject matter of this Application is related to U.S. Provisional Application 62/800,468, filed 2 Feb. 2019 ("First Parent Provisional").

The subject matter of this Application is also related to U.S. patent application Ser. No. 15/974,412, filed 8 May 2018 ("First Related Patent Application"), now U.S. Pat. No. 10,509,116.

The subject matter of this Application is also related to U.S. Pat. No. 10,056,993, issued 21 Aug. 2018 ("First Related Patent").

The subject matter of the First Parent Provisional, First Related Patent Application, and the First Related patent, each in its entirety, is expressly incorporated herein by reference.

This application claims priority to the First Parent Provisional, and hereby claims benefit of the filing date thereof pursuant to 37 CFR § 1.78(a)(4).

BACKGROUND OF THE INVENTION

1. Field of the Invention

The present invention relates generally to ultra-wideband communication systems, and, in particular, to a receiver for use in an ultra-wideband communication system adapted to determine the angle of departure of an RF signal transmitted by an RF transmitter.

2. Description of the Related Art

In general, in the descriptions that follow, we will italicize the first occurrence of each special term of art which should be familiar to those skilled in the art of ultra-wideband ("UWB") communication systems. In addition, when we first introduce a term that we believe to be new or that we will use in a context that we believe to be new, we will bold the term and provide the definition that we intend to apply to that term. In addition, throughout this description, we will sometimes use the terms assert and negate when referring to the rendering of a signal, signal flag, status bit, or similar apparatus into its logically true or logically false state, respectively, and the term toggle to indicate the logical inversion of a signal from one logical state to the other. Alternatively, we may refer to the mutually exclusive boolean states as logic_0 and logic_1. Of course, as is well known, consistent system operation can be obtained by reversing the logic sense of all such signals, such that signals described herein as logically true become logically false and vice versa. Furthermore, it is of no relevance in such systems which specific voltage levels are selected to represent each of the logic states.

In prior art systems that calculate angle of arrival ("AoA"), such as those referenced in the First Related Patent, there are two or more receive antennas and one transmit antenna. A transmitter transmits an RF signal, e.g., a channel sounding signal, using the single transmit antenna. The receiver receives a portion of the transmitted signal via its first receive antenna. It then switches to receive another portion of the transmitted signal from the second receive antenna. It may thereafter continue to any remaining receive antennas. The receiver can now calculate a phase from each of the signal portions received from each of the several receive antennas as a function of the complex baseband impulse response ("CIR") of the channel. These phases are then used to calculate the phase differences of arrival between one or more pairs of receive antennas. This phase difference of arrival can be used to calculate an angle of arrival. Alternatively, the phase difference of arrival can be used, in conjunction with a range, directly to calculate the (x,y) cartesian position of the transmit antenna with respect to the receive antennas.

In all of the prior art AoA systems known to us, either: each receiver must be provided with multiple, switchable receive antennas; or each receiver must, in fact, comprise multiple, cooperating receivers, each having a respective receive antenna. However, in general, modern RF communication devices, e.g., cell phones, have only a single antenna, and to add a second would significantly increase the cost and computational complexity.

In some applications, UWB signals are forbidden from being transmitted by fixed installations, but are allowed to be transmitted by mobile devices and are allowed to be received by fixed installations. In such applications, prior art AoA approaches simply will not work.

What is needed is a method and apparatus for use in an RF receiver for determining the angle of departure ("AoD") of an RF signal transmitted by an RF transmitter. In particular, we submit that such a method and apparatus should provide performance generally comparable to the best prior art techniques but more efficiently than known implementations of such prior art techniques.

BRIEF SUMMARY OF THE INVENTION

In accordance with one embodiment of our invention, we provide a method for use in a UWB communication system comprising a UWB transmitter and a UWB receiver. In particular, by way of example, the transmitter has first and second transmit antennae separated by a distance, d, and the receiver has a single receive antenna In accordance with our method, we first transmit a selected first portion of the signal using the first transmit antenna; and, upon receiving the transmitted first portion of the signal via the receive antenna, we develop a first phase value of the received first portion of the signal. Second, we transmit a selected second portion of the signal using the second transmit antenna; and, upon receiving the transmitted second portion of the signal via the receive antenna, we develop a second phase value of the received second portion of the signal. Finally, we develop a path difference value, p, as a function of the first and second phase values.

In one enhanced embodiment, we develop an angle of departure of the signal transmitted by the transmitter relative to the receiver as a function of d, r and p.

In one other enhanced embodiment, we determine a distance r between the receive antenna and a mid-point between the first transmit antenna and the second transmit antenna; and then develop an (x,y) Cartesian position of the transmitter relative to the receiver as a function of d, r and p.

In one other embodiment, we provide an angle of departure circuit configured to perform our method for determining angle of departure.

In another embodiment, we provide an RF receiver comprising an AoD circuit configured to perform our method for determining angle of departure.

In yet another embodiment, we provide an RF transceiver comprising an RF receiver comprising an AoD circuit configured to perform our method for determining angle of departure.

In still another embodiment, we provide an RF communication system comprising an RF transceiver comprising an RF receiver comprising an AoD circuit configured to perform our method for determining angle of departure.

The methods of our invention may be embodied in non-transitory computer readable code on a suitable computer readable medium such that when a processor executes the computer readable code, the processor executes the respective method.

BRIEF DESCRIPTION OF THE SEVERAL VIEWS OF THE DRAWINGS

Our invention may be more fully understood by a description of certain preferred embodiments in conjunction with the attached drawings in which.

Figure 1:
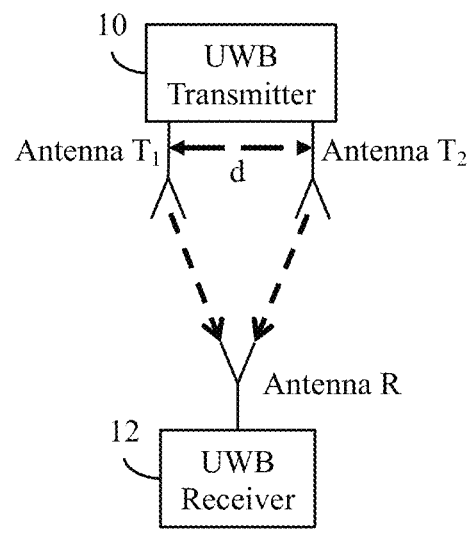
FIG. 1 illustrates, generally in topographic perspective, an RF communication system, and, in particular, illustrates the different angles of incidence of two RF signals transmitted by respective transmit antennas spaced a distance d apart, as received by a single receive antenna.
Figure 2:
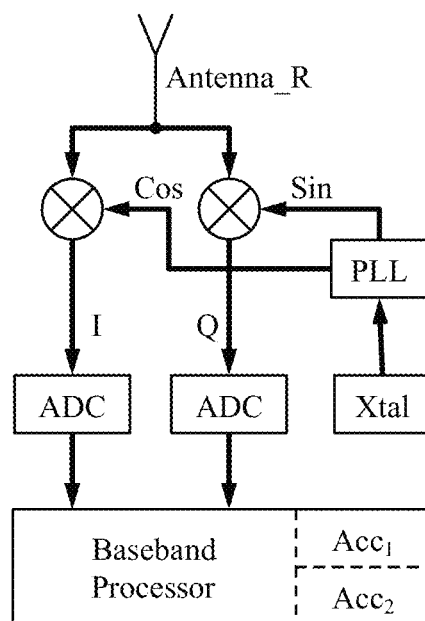
FIG. 2 illustrates, in block diagram form, RF receiver 12 of FIG. 1.
Figure 3:
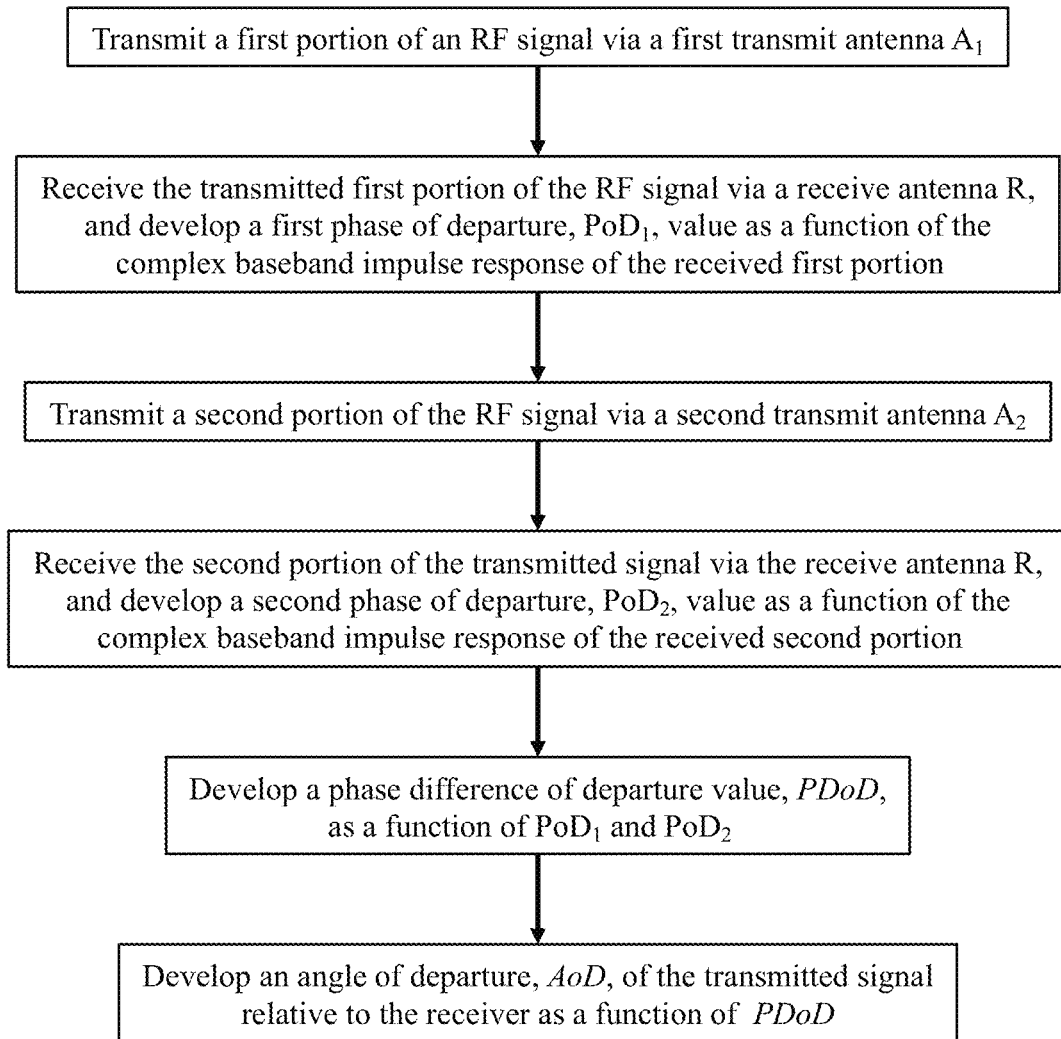
FIG. 3 illustrates, in flow diagram form, one embodiment of our invention to determine the AoD of an RF signal transmitted by a multi-antenna transmitter to a single-antenna receiver.

In the drawings, similar elements will be similarly numbered whenever possible. However, this practice is simply for convenience of reference and to avoid unnecessary proliferation of numbers, and is not intended to imply or suggest that our invention requires identity in either function or structure in the several embodiments.

DETAILED DESCRIPTION OF THE INVENTION

As illustrated in FIG. 1, the transmitter 10 would have two transmit antennas, antenna $T_1$ and antenna $T_2$, and be configured to transmit a first portion of a channel sounding signal via antenna $T_1$ and a second portion of the channel sounding signal via antenna $T_2$. The receiver 12, which has only a single receive antenna, Antenna_R, comprises two accumulators, $Acc_1$ and $Acc_2$, and is configured to accumulate into $Acc_1$ a correlation of the first portion of the signal transmitted via antenna $T_1$, and then accumulate into $Acc_2$ a correlation of the second portion of the transmitted signal transmitted via antenna $T_2$.

As is well know in this art, each of the accumulated correlations comprise respective channel impulse response estimates. From each such estimate, a respective phase of departure ("PoD") can be calculated using known techniques. A phase difference of departure ("PDoD") can then be calculated as a function of the difference between the PoDs of each selected transmit antenna pairs. The AoD can now be calculated as a function of the PDoD. In one embodiment, if the distance between the transmitter 10 and receiver 12 is known, a priori, the PDOD can be used to calculate the (x,y) cartesian position of the transmit antennas.

Figure 4:
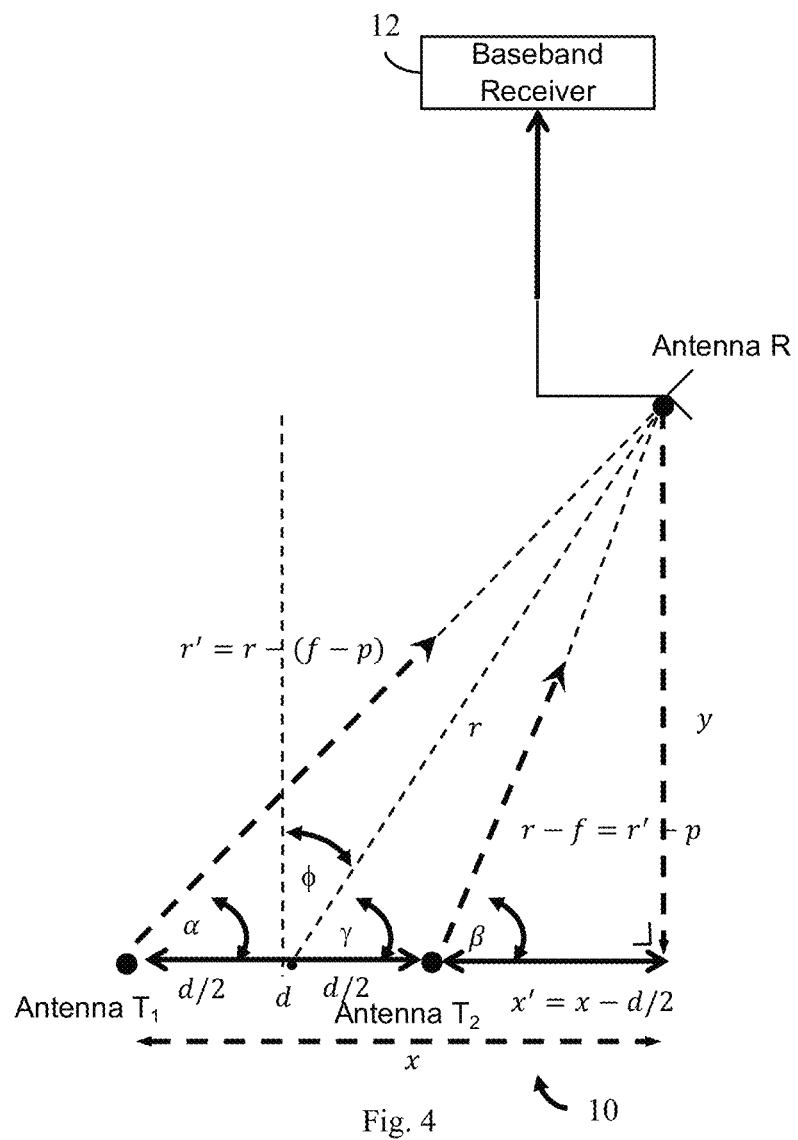
FIG. 4 illustrates, in topographic perspective, one geometric embodiment of the communication of FIG. 1.

In the scenario shown in FIG. 4, the distance between receive Antenna R and the mid-point of transmit Antenna $T_1$ and transmit Antenna $T_2$ is r. The angle of departure from Antenna $T_1$ is $\alpha$, from Antenna $T_2$ is $\beta$, and from the mid-point between Antenna $T_1$ and Antenna $T_2$ is $\gamma$. This quantity, $\gamma$, is the angle of departure. The signal travelling from Antenna $T_1$ to Antenna R travels a slightly different distance than the signal travelling from Antenna $T_2$ to Antenna R. We will call that path difference p.

We can use well known methods to find the distance r between Antenna R and the mid-point between Antenna $T_1$ and Antenna $T_2$, e.g., by determining the time of flight of a signal transmitted from the transmitter 10 to the receiver 12.

Provided that the distance d between two transmit antennas is less than or equal to one-half wavelength ("$\lambda$") of the radio signals received by Antenna R, the path difference p will always be somewhere between $-\lambda/2$ and $+\lambda/2$.

So, if we can measure the phase of arrival at Antenna R of each of the signals transmitted by Antenna $T_1$ and Antenna $T_2$, the phase difference going from $-180°$ to $+180°$ can give us a path difference varying from $-\lambda/2$ to $+\lambda/2$. We wish to find the (x,y) Cartesian location of the transmitter 10 with respect to the receiver 12. So, we can use known methods to find the distances x and y.

Using the cosine rule:

$$\cos(A) = \frac{b^2 + c^2 - a^2}{2bc}$$

And let $A = \gamma$, $a = r - f$, $b = r$, $c = d/2$ $$\cos(\gamma) = \frac{x}{r} = \frac{r^2 + \frac{d^2}{4} - r^2 + 2rf - f^2}{rd}$$

[Eq. 1]

$$x = \frac{d^2 + 8rf - 4f^2}{4d}$$

[Eq. 2]

$$x = \frac{2rf}{d} - \frac{f^2}{d} + \frac{d}{4} \qquad (1a)$$

Using the cosine rule:

$$\cos(A) = \frac{b^2 + c^2 - a^2}{2bc}$$

Let $A = \alpha$, $a = r' - p$, $b = r'$, $c = d$ $$\cos(\alpha) = \frac{r'^2 + d^2 - (r' - p)^2}{2r'd}$$

$$\frac{x'}{r'} = \frac{r'^2 + d^2 - r'^2 + 2r'p - p^2}{2r'd}$$

[Eq. 3]

$$x' = \frac{d^2 + 2r'p - p^2}{2d}$$

[Eq. 4]

$$x' = \left(r' - \frac{p}{2}\right)\frac{p}{d} + \frac{d}{2}$$

From [Eq. 4], substituting x' and $$r'x = \left(r + p - f - \frac{p}{2}\right)\frac{p}{d}$$

$$\frac{xd}{p} = r + p - f - \frac{p}{2}$$

$$f = r - \frac{xd}{p} + \frac{p}{2}$$

Substitute f into [Eq. 2]

$$x = \left(2r\left(r - \frac{xd}{p} + \frac{p}{2}\right)\right)/d - \left(r - \frac{xd}{p} + \frac{p}{2}\right)^2/d + d/4$$

Solving for x gives:

[Eq. 5]
$$x = \frac{p\sqrt{4r^2 + d^2 - p^2}}{2d}$$

[Eq. 6]
$$y = \pm\sqrt{r^2 - x^2}$$

Alternatively, substituting x $$y = \frac{\sqrt{-d^2p^2 + 4d^2r^2 + p^4 - 4p^2r^2}}{2d}$$

$$p^4 \text{ and } d^2p^2 << 4d^2r^2$$

$$y \approx \frac{\sqrt{4d^2r^2 - 4p^2r^2}}{2d}$$

[Eq. 7]
$$y \approx r\sqrt{1 - \frac{p^2}{d^2}}$$

[Eq. 8]
$$x = \frac{p\sqrt{4r^2 + d^2 - p^2}}{2d}$$

[Eq. 9]
$$x \approx r\frac{p}{d}$$

We can also find the angle of departure, $\gamma$, as:

[Eq. 10]
$$\gamma = \tan^{-1}\left(\frac{y}{x}\right) = \tan^{-1}\left(\frac{d}{p}\sqrt{1 - \frac{p^2}{d^2}}\right) = \tan^{-1}\left(\sqrt{\frac{d^2}{p^2} - 1}\right)$$

So, using [Eq. 5] and [Eq. 6], or [Eq. 7] and [Eq. 8], we have calculated the (x,y) Cartesian position of the transmitter 10 relative to the receiver 12, and the angle of departure, $\gamma$. We just need to know:

r—the range from the receive antenna to the mid-point of the transmit antennas;

d—the distance between the two transmit antennas; and p—the path difference for the signals arriving at the receive antenna.

One of the most accurate ways to get the path difference is to get the phase difference of departure of a signal in fractions of a cycle, and then multiply by the wavelength of the carrier.

[Eq. 11]
$$p = \lambda * \left(\frac{\theta}{2\pi}\right)$$

Where $\theta$ is the phase difference expressed in radians.

Another way is to get the time difference of arrival of a signal and multiply by the speed of light. A third way is to get the difference in time of flight and then multiply by the speed of light.

Figure 5:
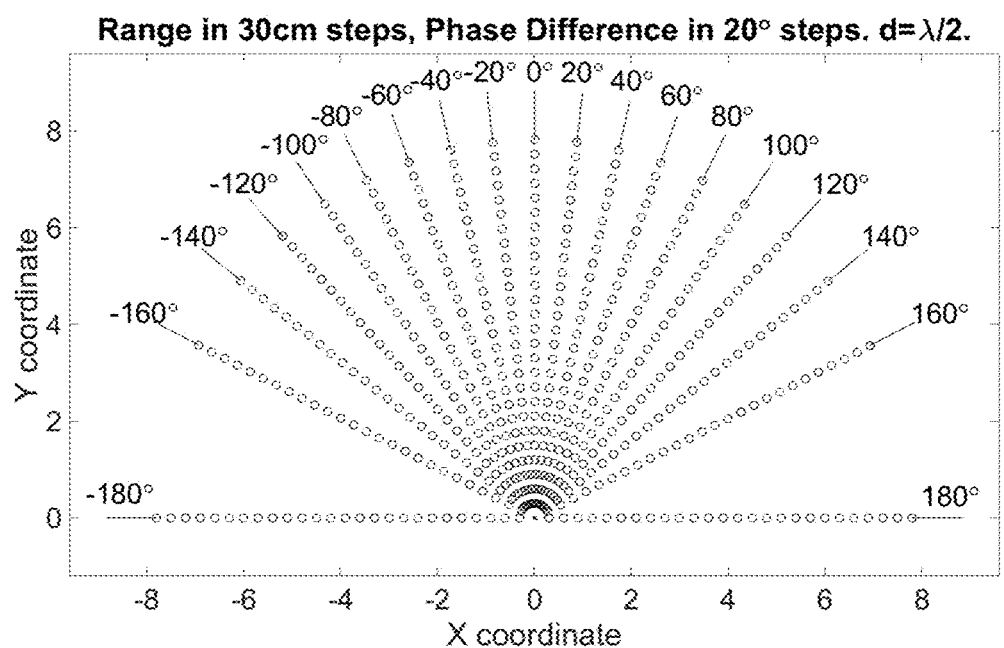
FIG. 5 illustrates, in chart form, the relationship between range and phase difference for an antenna separation of $\lambda/2$ using a single carrier.

We can see from FIG. 5 that the position uncertainty at phase differences near +/−180 is quite large. A very small change in phase gives a large change in y position. We can see this sensitivity in [Eq. 10] which contains a $(1-(p/d)^2)$ term under the radical.

Let us consider why is it useful to determine angle of departure from the perspective of the transmitter rather than the traditional angle of arrival from the perspective of the receiver:

1. Multiple receivers can calculate the angle (and hence position) from a single transmitted signal (or groups of transmitted packets) sent by one central device;
2. AoD could be useful in inverse time difference of arrival ("TDOA") schemes (which could also be called TDOD), which would now become inverse TDOA hybrid with inverse PDOA, i.e., phase difference of departure (PDOD);
3. In inverse TDOA, anchors only transmit and tags only receive and calculate their positions from TDOA. The advantage of our method is practically unlimited number of tags, and the fact that tags don't need to synchronize their transmissions in the MAC sense. In the other words, the traffic does not get more complex with increasing numbers of tags;
4. System performance would be improved, or the number of the anchors needed would be reduced, by implementing AoD (PDOD);
5. If an anchor (with 2 transmit antennas) initiates a wireless communication, there would be no need to have a 3rd/final message to get the phase difference info back to the tag, thus reducing airtime (power/density);
6. If the height of the devices are known (like a robot in a factory or house) navigation could be delivered to an unlimited number of devices using a reverse TDoA/PDoA combo with a single anchor (which would need 4 transmit antennas);
7. If the tag knows, a priori, the positions of three anchors and its own height relative to the anchor height, all it needs to calculate its own position is the angle at which the signal came in from each anchor (which can be calculated from the AoD); and
8. As has been noted, above, in some applications, UWB signals are forbidden from being transmitted by fixed installations but are allowed to be transmitted by mobile devices and are allowed to be received by fixed installations. In these cases, the mobile device can have two or more antennas and can transmit a UWB signal of the type described in this specification. The fixed installations can receive this special signal and calculate the angle to the mobile devices. The position of the mobile device can then be calculated from a number of these AoDs and the position of the installations that received them.

Although we have described our invention in the context of particular embodiments, one of ordinary skill in this art will readily realize that many modifications may be made in such embodiments to adapt either to specific implementations. For example, rather than calculating AoD using only a single pair of transmit antennas, additional transmit antennas may be provided, each selectively transmitting a respective portion of the RF signal. Further, the several elements described above may be adapted so as to be operable under either hardware or software control or some combination thereof, as is known in this art. Alternatively, the several methods of our invention as disclosed herein in the context of special purpose receiver apparatus may be embodied in computer readable code on a suitable non-transitory computer readable medium such that when a general or special purpose computer processor executes the computer readable code, the processor executes the respective method.

Thus it is apparent that we have provided a method and apparatus for determining the AoD of an RD signal transmitted by a multi-antenna transmitter to a single-antenna receiver. Although we have so far disclosed our invention only in the context of a packet-based UWB communication system, we appreciate that our invention is broadly applicable to other types of wireless communication systems, whether packed-based or otherwise, that perform channel sounding. Further, we submit that our invention provides performance generally comparable to the best prior art techniques but more efficiently than known implementations of such prior art techniques.

What we claim is:

1. In an ultra-wideband (UWB) system comprising a UWB transmitter having first and second transmit antennae separated by a distance, d, and adapted to transmit a signal, and a UWB receiver having a receive antenna, a method comprising the steps of:
   using the first transmit antenna to transmit a selected first portion of the signal;
   using the UWB receiver to:
      receive, via the receive antenna, the transmitted selected first portion of the signal;
      develop a first phase value as a function of a complex baseband impulse response of the received selected first portion of the signal; and
      determine a first time of flight of the transmitted selected first portion of the signal transmitted from the first transmit antenna to the receive antenna;
   using the second transmit antenna to transmit a selected second portion of the signal; and
   using the UWB receiver to:
      receive, via the receive antenna, the transmitted selected second portion of the signal;
      develop a second phase value as a function of the complex baseband impulse response of the received selected second portion of the signal;
      determine a second time of flight of the transmitted selected second portion of the signal transmitted from the second transmit antenna to the receive antenna;
      determine a distance, r, between the receive antenna and a mid-point between the first transmit antenna and the second transmit antenna;
      develop a path difference value, p, as a function of the first and second phase values; and
      develop an (x,y) Cartesian position of the UWB transmitter relative to the UWB receiver as a function of d, r and p.

2. The method of claim 1 further comprising the step of: developing an angle of departure of the signal transmitted by the UWB transmitter relative to the UWB receiver as a function of d and p.

3. A location determination circuit configured to perform the method of claim 1.

4. An RF receiver comprising the location determination circuit according to claim 3.

5. An RF transceiver comprising a wireless receiver according to claim 4.

6. An RF communication system comprising a wireless transceiver according to claim 5.

7. A non-transitory computer readable medium including executable instructions which, when executed in an RF system, cause the system to perform the steps of a method according to claim 1.

8. In an ultra-wideband (UWB) system comprising a UWB transmitter having first and second transmit antennae separated by a distance, d, and adapted to transmit a signal, and a UWB receiver having a receive antenna, a method comprising the steps of:
   using the first transmit antenna to transmit a selected first portion of the signal;
   using the UWB receiver to:
      receive, via the receive antenna, the transmitted selected first portion of the signal;
      develop a first time of arrival as a function of a complex baseband impulse response of the received selected first portion of the signal;
      determine a first time of flight of the portion of the signal transmitted from a selected one of the first and second transmit antennas to the receive antenna; and
      determine a distance, r, between the receive antenna and the selected transmit antenna as a function of the first time of flight;
   using the second transmit antenna to transmit a selected second portion of the signal; and
   using the UWB receiver to:
      receive, via the receive antenna, the transmitted selected second portion of the signal;
      develop a second time of arrival as a function of the complex baseband impulse response of the received selected second portion of the signal;
      develop a path difference value, p, as a function of the first and second times of arrival; and
      develop an (x,y) Cartesian position of the UWB transmitter relative to the UWB receiver as a function of d, r and p.

9. The method of claim 8 further comprising the step of: developing an angle of departure of the signal transmitted by the UWB transmitter relative to the UWB receiver as a function of d and p.

10. A location determination circuit configured to perform the method of claim 8.

11. An RF receiver comprising the location determination circuit according to claim 10.

12. An RF transceiver comprising a wireless receiver according to claim 11.

13. An RF communication system comprising a wireless transceiver according to claim 12.

* * * * *